(12) United States Patent
Tillman et al.

(10) Patent No.: US 8,714,900 B2
(45) Date of Patent: May 6, 2014

(54) WEAR SYSTEM FOR RECEPTACLE WITH SLIDING FRAME

(75) Inventors: Franz Tillman, Lagrangeville, NY (US); Rance Hornberger, Woodbury, MN (US); Erik Weisser, Centerville, MN (US)

(73) Assignee: Schwing Bioset, Inc., Sommerset, WI (US)

( * ) Notice: Subject to any disclaimer, the term of this patent is extended or adjusted under 35 U.S.C. 154(b) by 728 days.

(21) Appl. No.: 12/661,354

(22) Filed: Mar. 16, 2010

(65) Prior Publication Data

US 2011/0229291 A1   Sep. 22, 2011

(51) Int. Cl.
*B65G 65/44* (2006.01)
*B65D 88/54* (2006.01)
*B65D 88/66* (2006.01)

(52) U.S. Cl.
CPC .............. *B65G 65/44* (2013.01); *B65D 88/54* (2013.01); *B65D 88/66* (2013.01)
USPC ........................................ 414/298; 414/306

(58) Field of Classification Search
USPC .................................. 414/298, 306
See application file for complete search history.

(56) References Cited

U.S. PATENT DOCUMENTS

| | | | |
|---|---|---|---|
| 3,622,018 A | 11/1971 | Morris | |
| 3,748,807 A * | 7/1973 | Sterner | 52/632 |
| 3,985,244 A | 10/1976 | Gessler et al. | |
| 4,043,488 A | 8/1977 | Halvorsen et al. | |
| 4,157,761 A | 6/1979 | Debor | |
| 4,363,586 A | 12/1982 | Gessler et al. | |
| 4,512,705 A | 4/1985 | Gutsch | |
| 4,531,876 A | 7/1985 | Gessler | |
| 4,619,381 A | 10/1986 | Wurtz | |
| 4,731,179 A | 3/1988 | De Baere | |
| 4,763,777 A | 8/1988 | Hooper et al. | |
| 4,858,949 A * | 8/1989 | Wallace et al. | 280/124.116 |
| 5,407,103 A | 4/1995 | Clarstrom et al. | |
| 5,540,533 A | 7/1996 | Eskelinen | |
| 5,636,849 A * | 6/1997 | Jonsson et al. | 277/505 |

(Continued)

FOREIGN PATENT DOCUMENTS

DE  21 04 798 A1  8/1971
EP  0 036 695 A1  9/1981

(Continued)

OTHER PUBLICATIONS

The International Bureau of WIPO, Notification Concerning Transmittal of Cop of International Preliminary Report on Patentability (Chapter I of the Patent Cooperation Treaty), Sep. 27, 2012, 11 pages.

(Continued)

*Primary Examiner* — Scott Lowe
(74) *Attorney, Agent, or Firm* — Kinney & Lange, P.A.

(57) ABSTRACT

A system for reducing wear includes a receptacle having at least one wall and a floor for holding material within the receptacle. An opening is located in the floor for accessing material held in the receptacle. A sliding frame is located above and parallel to the floor for agitating material held in the receptacle. At least one component is included inside the receptacle to reduce wear on the floor and/or sliding frame, and/or a wear indicator is located outside of the receptacle to monitor wear on the floor and/or the sliding frame.

20 Claims, 7 Drawing Sheets

(56) References Cited

U.S. PATENT DOCUMENTS

| | | | |
|---|---|---|---|
| 5,667,039 A * | 9/1997 | Spiess | 187/334 |
| 5,785,486 A | 7/1998 | McNeilus et al. | |
| 5,833,092 A | 11/1998 | Godfrey et al. | |
| 5,971,694 A | 10/1999 | McNeilus et al. | |
| 6,123,500 A | 9/2000 | McNeilus et al. | |
| 6,129,215 A | 10/2000 | Brauch et al. | |
| 6,190,105 B1 | 2/2001 | Zey | |
| 6,220,757 B1 | 4/2001 | Yamagiwa et al. | |
| 6,224,318 B1 | 5/2001 | McNeilus et al. | |
| 6,451,163 B2 | 9/2002 | Prough et al. | |
| 6,607,347 B2 * | 8/2003 | Burgo | 414/680 |
| 8,267,635 B2 * | 9/2012 | Brey | 414/306 |
| 2002/0145278 A1 * | 10/2002 | Hulse et al. | 280/763.1 |
| 2006/0263190 A1 | 11/2006 | Frieden | |

FOREIGN PATENT DOCUMENTS

| | | |
|---|---|---|
| EP | 0 112 937 A1 | 7/1984 |
| EP | 0988244 A1 | 3/2000 |
| EP | 1086913 A1 | 3/2001 |
| GB | 1 333 976 | 10/1973 |

OTHER PUBLICATIONS

Invitation to Pay Additional Fees and, Where Applicable, Protest Fee from Application Serial No. PCT/US2011/028272, filed Mar. 14, 2011.

* cited by examiner

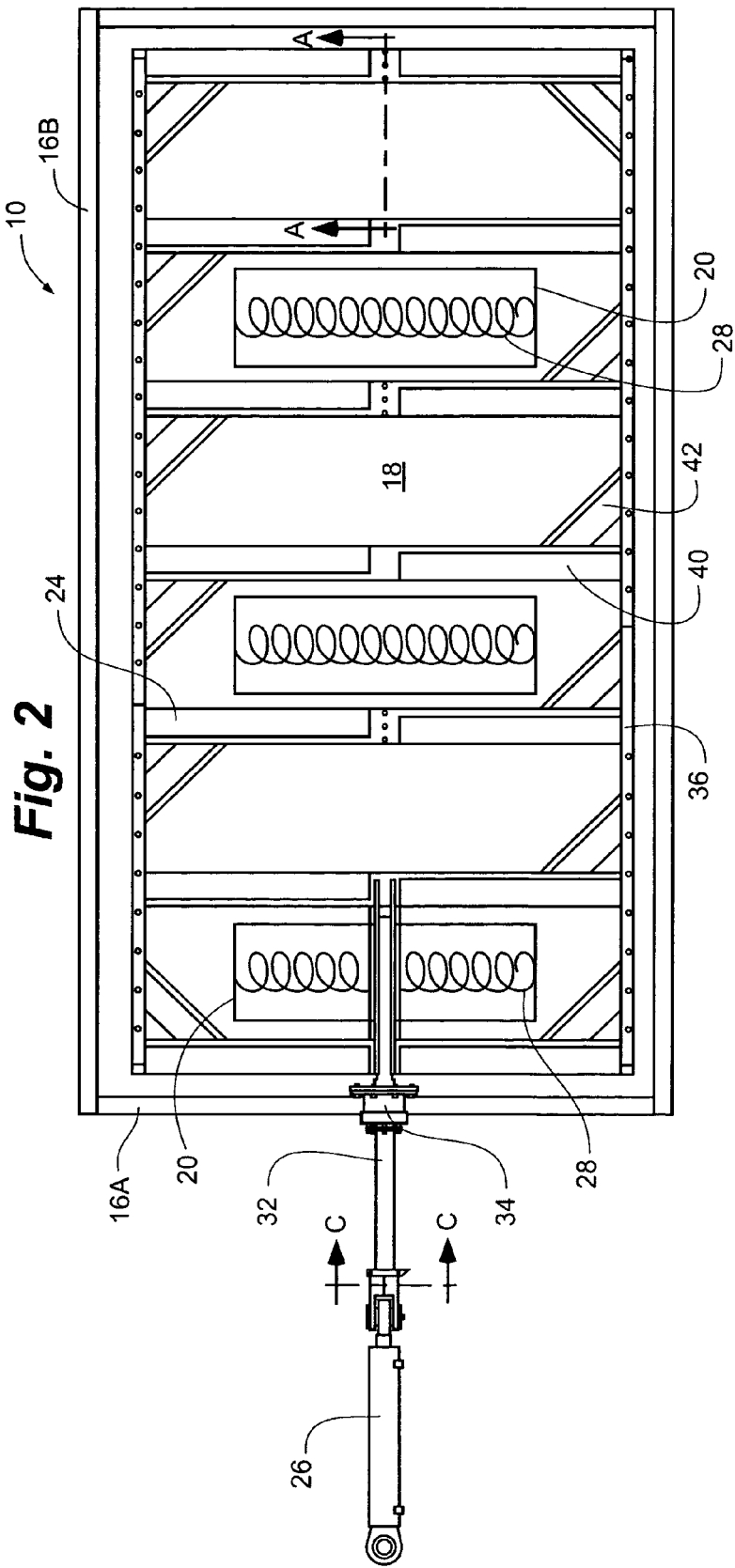
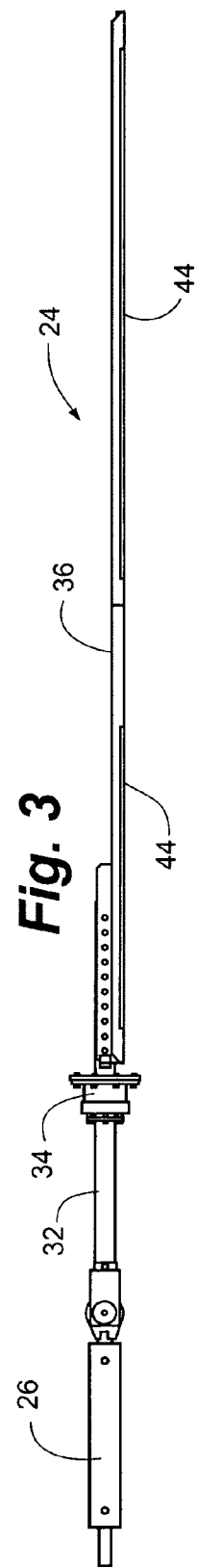

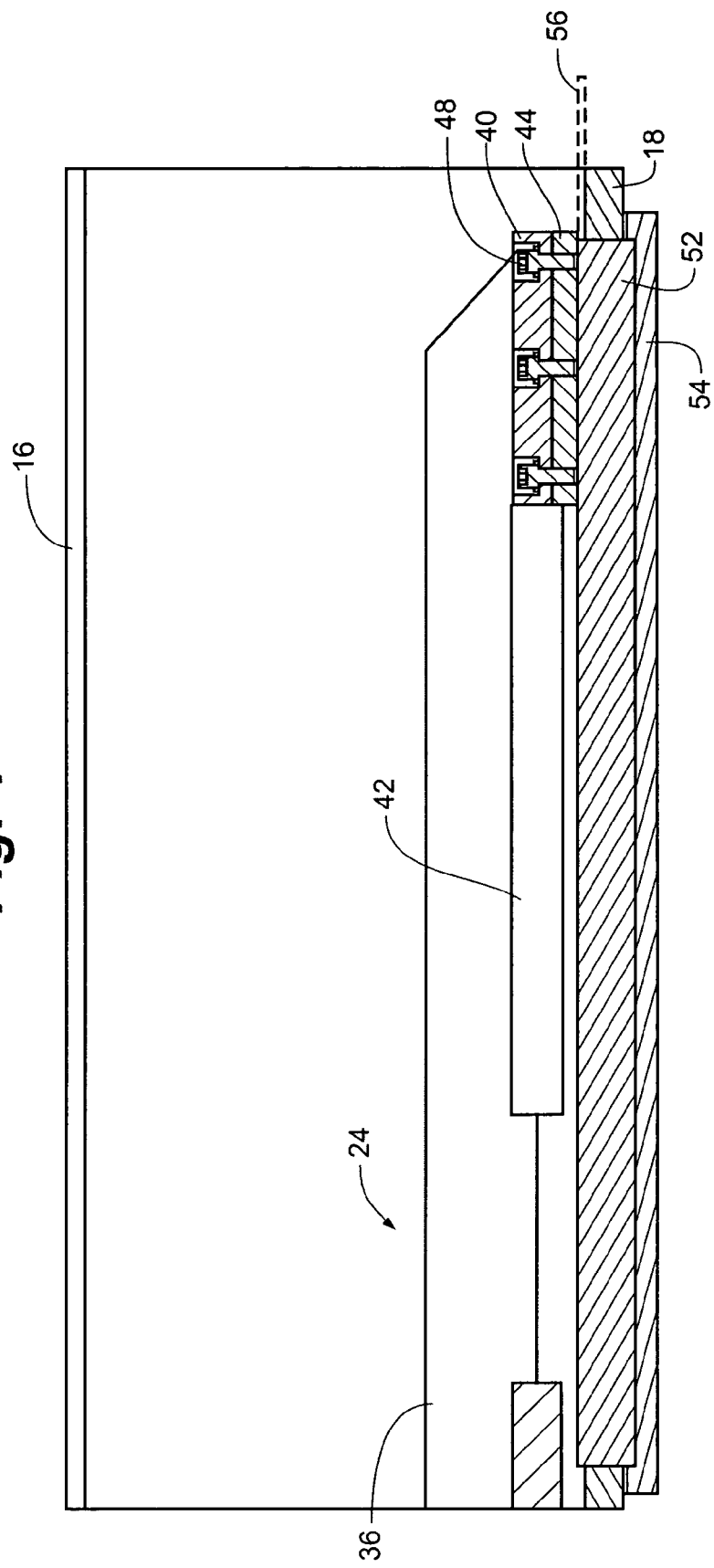

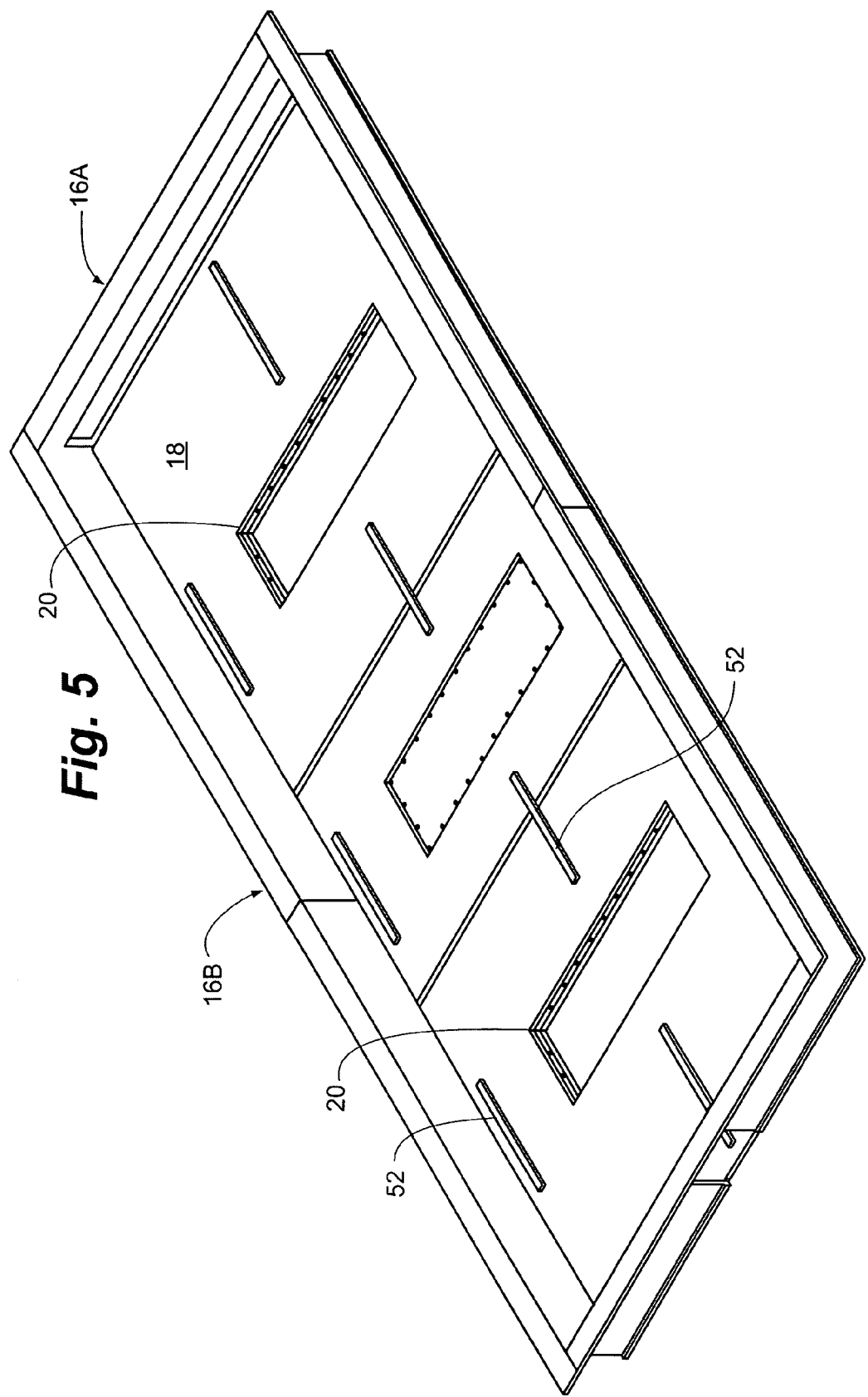

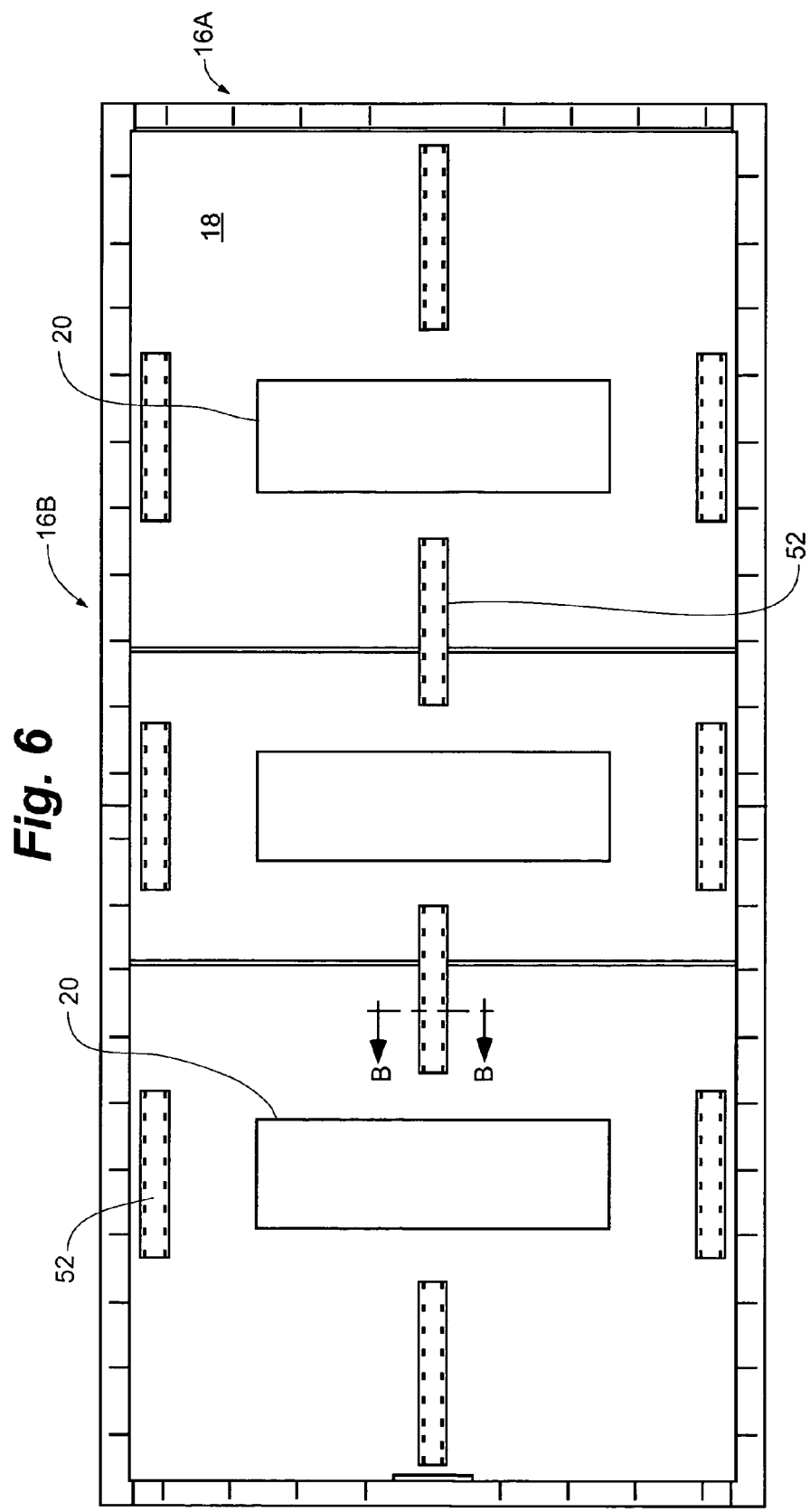

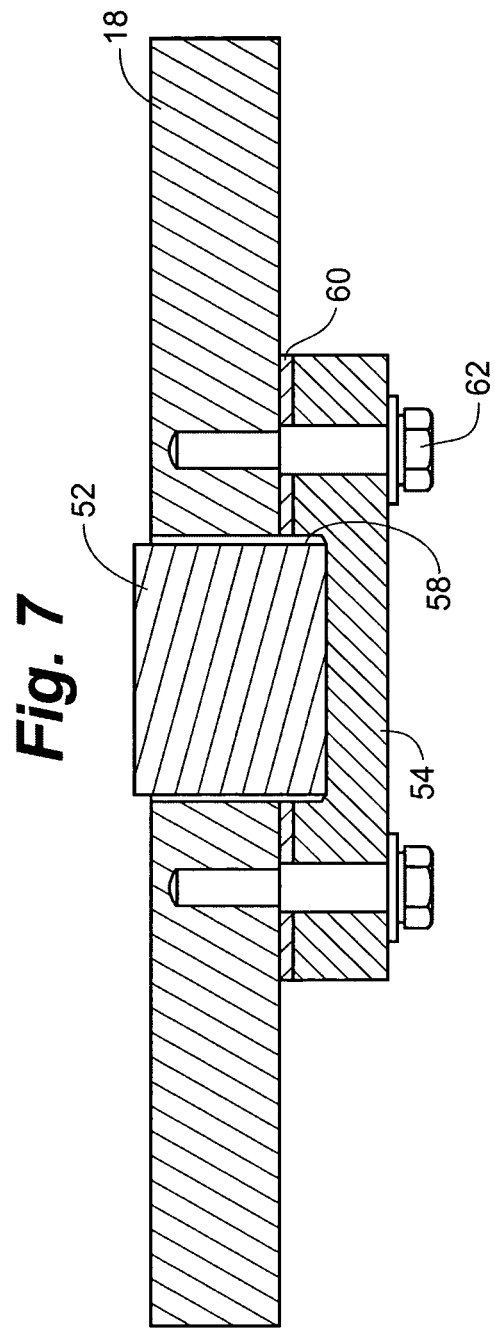

WEAR SYSTEM FOR RECEPTACLE WITH SLIDING FRAME

BACKGROUND

The present invention relates generally to a system for reducing and monitoring wear on mechanical components. More specifically, the present invention relates to reducing and monitoring wear in a holding receptacle having a sliding frame.

Bins and silos are large holding receptacles used to store and discharge materials. Bins are typically rectangular while silos are typically cylindrical, but both have an inlet at the top for introducing material and an outlet at the bottom for removing material. For the sake of simplicity, bins and silos are referred to collectively as "bins" or "receptacles" throughout this disclosure.

Virtually any type of material may be placed into a bin and later discharged. Viscous wet materials, however, are difficult to discharge because they are not free-flowing. For example, municipal waste sludge stored in bins tends to clump together and form bridges over a discharge opening. Discharge devices, such as a sliding frame, may be incorporated into the bottom of a bin above a discharge opening to dislodge material bridges and induce sludge flow.

SUMMARY

An embodiment of the present invention is a system including a receptacle having at least one wall and a floor for holding material within the receptacle. An opening is located in the floor for accessing material held in the receptacle. A sliding frame is located above and parallel to the floor for agitating material held in the receptacle. At least one wear bar extends above a top of the floor toward the sliding frame. The wear bar raises the sliding frame off the floor to prevent contact between the sliding frame and the floor.

Another embodiment of the present invention is a system for reducing wear on a holding receptacle floor and sliding frame. The system includes a plurality of hard plate inserts and a plurality of soft wear bars. The hard plate inserts are attached to a bottom of the sliding frame and extend toward the floor. The soft wear bars are attached to the floor and extend above a top of the floor toward the sliding frame. The wear bars space the sliding frame from the floor and prevent contact therebetween.

Yet another embodiment of the present invention is a system including a receptacle having at least one wall and a floor for holding material within the receptacle. An opening is located in the floor for accessing material held in the receptacle. A sliding frame is located above and parallel to the floor for agitating material held in the receptacle. A hydraulic cylinder located outside of the wall. An extension shaft has a first end attached to the hydraulic cylinder, a center extending through the wall, and a second end attached to the sliding frame for actuating the frame across the floor. A wear indicator is located on the first end of the extension shaft for indicating mechanical erosion within the receptacle.

BRIEF DESCRIPTION OF THE DRAWINGS

FIG. 2 is a top view of the bin and sliding frame from FIG. 1.

FIG. 3 is a side view of the sliding frame from FIG. 2.

FIG. 4 is a cross-section of the bin floor and sliding frame taken along line A-A in FIG. 2.

FIG. 5 is a perspective view of the bin floor from FIG. 1 with the sliding frame removed.

FIG. 6 is a bottom view of the bin floor from FIG. 5.

FIG. 7 is a cross-section of the bin floor taken along line B-B in FIG. 6.

DETAILED DESCRIPTION

Figure 1:
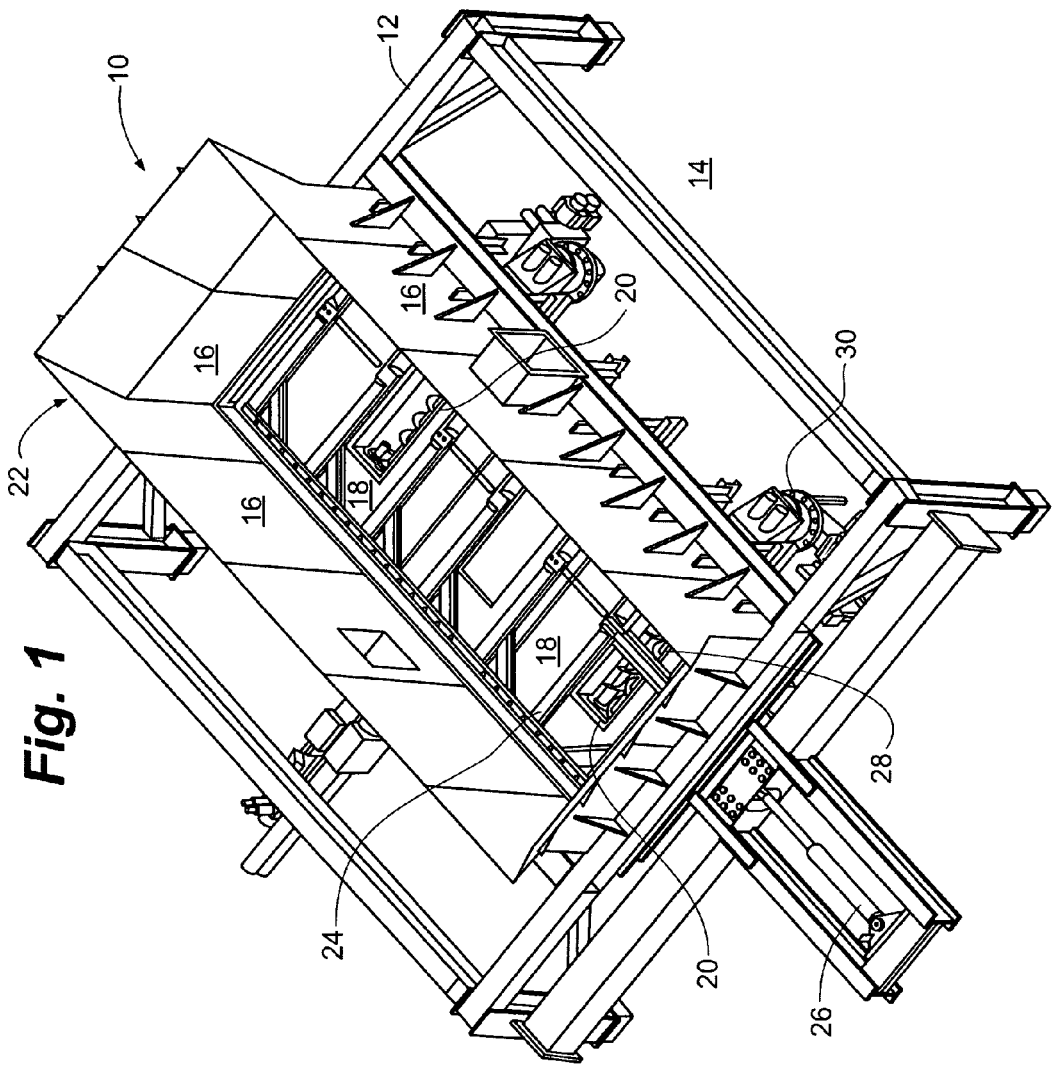
FIG. 1 is a perspective view of a bin having a sliding frame.

FIG. 1 is a perspective view of holding receptacle or bin 10 mounted to support 12 above ground 14. Depicted in FIG. 1 are: bin 10, support 12, ground 14, walls 16, floor 18, openings 20, top 22, sliding frame 24, hydraulic cylinder 26, screw auger 28, and pump 30. Material, such as municipal sludge, can be stored within, and discharged from, bin 10.

Support 12 is generally rectangular and has legs extending downwardly to ground 14. In other words, support 12 is a horizontally oriented frame vertically suspended above ground by legs. Bin 10 is fixed to a center of support 12 and therefore, suspended above ground 14. In the depicted embodiment, bin 10 has four walls 16 forming a rectangle. In other embodiments, bin 10 has a single wall 16 forming a cylinder. Attached to a bottom of walls 16 is floor 18. Together walls 16 and floor 18 form bin 10, which is a receptacle capable of retaining or holding material.

In the depicted embodiment, three rectangular openings 20 are located in floor 18 at spaced intervals, although differently shaped openings 20, as well as more or less openings 20 are equally possible. Openings 20 in floor 18 allow for material to be discharged from a bottom of bin 10. Opposite floor 18, is open top 22 formed by upstanding walls 16 of bin 10. Open top 22 allows material to be introduced into bin 10 for storage. Located within bin 10 just above and parallel to floor 18 is sliding frame 24. Sliding frame 24 has an open ladder-type structure for agitating material near floor 18 of bin 10. Attached to frame 24, but located outside of bin 10, is hydraulic cylinder 26 for actuating frame 24. Also located outside of bin 10, but positioned beneath openings 20 in floor 18 are screw augers 28 for collecting material discharged through openings 20 in floor. Attached to screw augers 28 are pumps 30 for pumping discharged material.

Material to be stored is loaded into bin 10 through open top 22. Material is then retained or held within bin 10 by walls 16 and floor 18. When material is ready for discharge, hydraulic cylinder 26 pushes and pulls sliding frame 24 back and forth across floor 18. Through this reciprocating movement of sliding frame 24, even highly viscous material is coaxed out of bin 10 through openings 20 in floor 18. Material exiting bin 10 is caught by screw auger 28 and moved by pump 30 to a desired location. For example, material can be pumped to a truck loading bay for transport to another location.

FIG. 2 is a top view of floor 18 and sliding frame 24 of bin 10 from FIG. 1. Depicted in FIG. 2 are: bin 10, walls 16A and 16B, floor 18, openings 20, sliding frame 24, hydraulic cylinder 26, screw augers 28, extension shaft 32, and stuffing box 34. Also shown are the components of sliding frame 24: outer rails 36, cross rails 40, and corner rails 42. Sliding frame 24 reciprocates across floor 18 to agitate material within bin 10.

Walls 16 define the perimeter of bin 10 and floor 18 defines a bottom of bin 10. Since bin 10 is rectangular, there are two shorter walls 16A and two longer walls 16B. Three spaced-apart openings 20 are located in floor 18 for allowing access to material stored in bin 10. Sliding frame 24 is located directly above, and is parallel with, floor 18. Three spaced-apart augers 28 are located directly beneath openings 20 for catching material falling therethrough. Extension shaft 32 attaches hydraulic cylinder 26 to sliding frame 24. Stuffing box 34 is centrally located in one of short walls 16A of bin 10, and is aligned with hydraulic cylinder 26. A first end of extension shaft 32 is attached to hydraulic cylinder 26 outside of short wall 16A. A center of extension shaft 32 extends from the outside, through stuffing box 34 and through short wall 16A, to the inside of bin 10. Once inside short wall 16A of bin, the center becomes a second end of extension shaft 32, which is attached to sliding frame 24.

Sliding frame 24 is defined on two sides by outer rails 36, which extend parallel to the long walls 16B of bin 10. A plurality of cross rails 40 extend from one outer rail 36 to the other opposite outer rail 36, thereby forming a ladder structure. Cross rails 40 are perpendicular to outer rails 36. Sliding frame 24 is defined on two sides by parallel cross rails 40, which extend parallel to short walls 16A of bin 10. Extension shaft 32 is attached to a first cross rail 40 a second cross rail 40 adjacent short wall 16A and stuffing box 34. Extending at an acute angle between cross rails 40 and outer rails 36 are corner rails 42. Cross rails 40 and corner rails 42 have beveled edges to slide under viscous material located at floor 18 of bin 10.

Hydraulic cylinder 26 pushes and pulls extension shaft 32 toward and away from stuffing box 34. As extension shaft 32 is pushed into stuffing box 34 and through short wall 16A, it pushes sliding frame 24 across floor 18 away from hydraulic cylinder 26. As extension shaft is pulled out of stuffing box 34 and through short wall 16A, it pulls sliding frame 24 back across floor 18 toward hydraulic cylinder 26. The pushing and pulling of hydraulic cylinder 26 is therefore, transferred through extension shaft 24 to sliding frame 24 to produce a reciprocating or back and forth motion. Stuffing box 34 seals material within walls 16 so that material cannot escape bin 10 while extension shaft is moving in and out of short wall 16A. Outer rails 36, cross rails 40, and corner rails 42 form the open structure of sliding frame 24 and are configured to agitate material near floor 18. The edges of the cross rails 40 and corner rails 42 are beveled to slide under material. As sliding frame 24 is actuated across floor 18, it coaxes material to fall through openings 20 and onto augers 28.

FIG. 3 is a side view of sliding frame 24 from FIG. 2. Depicted in FIG. 3 are: sliding frame 24, hydraulic cylinder 26, extension shaft 32, stuffing box 34, outer rail 36, and plate inserts 44. Plate inserts 44 are attached to outer rails 36 to reduce wear of sliding frame 24.

As described above with respect to FIG. 2, extension shaft 32 extends from hydraulic cylinder 26, through stuffing box 34, and connects to sliding frame 24. Extension shaft 32 is attached to a top of sliding frame 24 and plate inserts 44 are attached to a bottom of sliding frame 24. As hydraulic cylinder 26 reciprocates sliding frame 24 back and forth across floor 18, wear occurs on both floor 18 and sliding frame 24 where the two interact. In order to reduce wear of sliding frame 24, plate inserts 44 are attached to a bottom of outer rails 36 and cross rails 40. The structure and function of plate inserts 44 are described further below with respect to FIG. 4.

FIG. 4 is a cross-section of floor 18 and sliding frame 24 taken along line A-A in FIG. 2. Depicted in FIG. 4 are: wall 16, floor 18, sliding frame 24, outer rail 36, cross rail 40, corner rail 42, plate insert 44, bolts 48, wear bar 52, pocket 54, and wear distance 56. Wear bar 52 and plate insert 44 have sliding contact when sliding frame 24 reciprocates across floor 18.

Plate insert 44 is attached to a bottom of cross rail 40 by bolts 48. Bolts 48 extend through cross rail 40 and secure plate insert 44 beneath cross rail 40. Plate insert 44 and bolts 48 all fit within a machined pocket in cross rail 40 such that plate insert 44 extends just below the bottom of cross rail 40 toward floor 18. Each plate insert 44 is shorter than wear bar 52 with which it is in contact. Wear bar 52 is positioned within and attached to floor 18 by pocket 54. Wear bar 52 is placed on top of pocket 54, and pocket 54 is bolted to a bottom of floor 18 such that wear bar 52 extends through and just above a top surface of floor 18 toward sliding frame 24. Wear distance 56 is measured between a bottom of plate insert 44 and a top of floor 18. In the depicted embodiment, the maximum wear distance 56 is approximately an eighth of an inch, although smaller and greater distances are equally possible. A decrease in wear distance 56 indicates erosion of wear bar 52. Wear distance 56 can be monitored as described below with reference to FIG. 8.

Bolts 48 secure plate insert 44 into cross rail 40 of sliding frame 24. As sliding frame 24 reciprocates back and forth across floor 18, plate insert 44, and bolts 48 ride from a first end of wear bar 52 to the opposite, second end of wear bar 52. A bottom of plate insert 44 contacts a top surface of wear bar 52 mounted into floor 18 by pocket 54. Plate insert 44 is shorter than wear bar 52, and is positioned with respect to wear bar 52 such that plate insert 44 never rides beyond wear bar 52. Thus, surface-to-surface contact is maintained between plate inset 44 and wear bar 52. At no time during reciprocation of sliding frame 24 should plate insert 44 fall off an edge of wear bar 52 and come into direct contact with floor 18.

The frictional contact between plate insert 44 and wear bar 52 will cause the softer of the two components to erode over time. In one embodiment, sliding frame 24 (including outer rails 36 and cross rails 40) is formed from carbon steel, plate inserts 44 are formed from a hardened steel (such as tool steel), and wear bars 52 are formed from softer steel (such as 4140 or 4150 alloyed steel). As such, plate inserts 44 have a material hardness greater than wear bars 52. A multitude of other materials could be used so long as plate inserts 44 are "harder" than "softer" wear bars 52, thereby causing the material erosion to occur on easily replaceable wear bars 52 and not plate inserts 44, which are more difficult to replace. As the top surface of wear bar 52 erodes, wear distance 56 will decrease. Once wear distance 56 reaches a minimum near zero, it will be time to replace wear bar 52. For example, wear distance 56 could be near zero when wear bar 52 is nearly flush with floor 18.

FIG. 5 is a perspective view and FIG. 6 is a bottom view of floor 18 from FIG. 1 with sliding frame 24 removed. Depicted are: walls 16A and 16B, floor 18, openings 20, and wear bars 52. Wear bars extend upwardly through floor 18 to interact with plate inserts 44 on sliding frame 24 (removed).

Three wear bars 52 are located in floor 18 adjacent each long wall 16B at a regular interval. Four wear bars 52 are located centrally in floor 18 on either side of openings 20 at a regular interval. Although the depicted embodiment shows a total of ten wear bars 52, more or less wear bars 52 are contemplated and fall within the scope of this disclosure. Each longer wear bar 52 has frictional contact with a shorter plate insert 44 mounted to sliding frame 24 (removed) as depicted in FIG. 4 and described above. Wear bars 52 raise sliding frame 24 off of floor 18 so that sliding frame 24 is spaced from floor 18. Wear bars 52 and plate inserts 44 prevent frictional contact between floor 18 and sliding frame 24.

FIG. 7 is a cross-section of floor 18 and wear bar 52 taken along line B-B in FIG. 6. Depicted in FIG. 7 are: floor 18, wear bar 52, pocket 54, bar space 58, gasket 60, and bolts 62. Pocket 54 positions wear bar 52 within floor 18 for frictional contact with plate inserts 44 on sliding frame 24.

Pocket 54 has centrally located bar space 58 for receiving wear bar 52 therein. Wear bar 52 is dimensioned to fit within bar space 58 of pocket 54. When wear bar 52 is positioned in bar space 58 and pocket 54 is attached to a bottom of floor 18, a top surface of wear bar 52 extends through, and slightly above a top surface of floor 18 (as shown in FIG. 5 and FIG. 7). On either side of bar space 58, gasket 60 is positioned between pocket 54 and floor 18 to facilitate a sealing of bin 10 material. Bolts 62 extend through pocket 54 on either side of bar space 58, and continue through gasket 60 into floor 18. Pockets 54 indirectly mount wear bar 52 in floor 18.

Wear bars 52 are easily replaceable by removing pockets 54 from a bottom of floor 18. Removal of bolts 62 from pocket 54 releases both the wear bar 52 and pocket 54 downwardly from floor 18 below bin 10. When pocket 54 is dropped out of floor 18, sliding frame 24 "drops" downwardly toward floor 18. A first, used wear bar 52 can be removed from bar space 58 and replaced by a second, new wear bar 52. Pocket 54 holding the new wear bar 52 within bar space 58 is simply reattached to a bottom of floor 18 by bolts 62. New wear bar 52 will extend further through floor 18 and above a top surface of floor 18 than old wear bar 52. When pocket 54 is placed back into floor 18 with new wear bar 52, sliding frame 24 will be "jacked" back up by bolts 62 into an operational position where a bottom of plate inserts 44 ride across a top of new wear bars 52. In other words, wear distance 56 (see FIG. 4) will increase by replacing a used wear bar 52 with a newer, taller wear bar 52. Sliding frame 24 will be spaced above and no longer in contact with floor 18.

Figure 8:
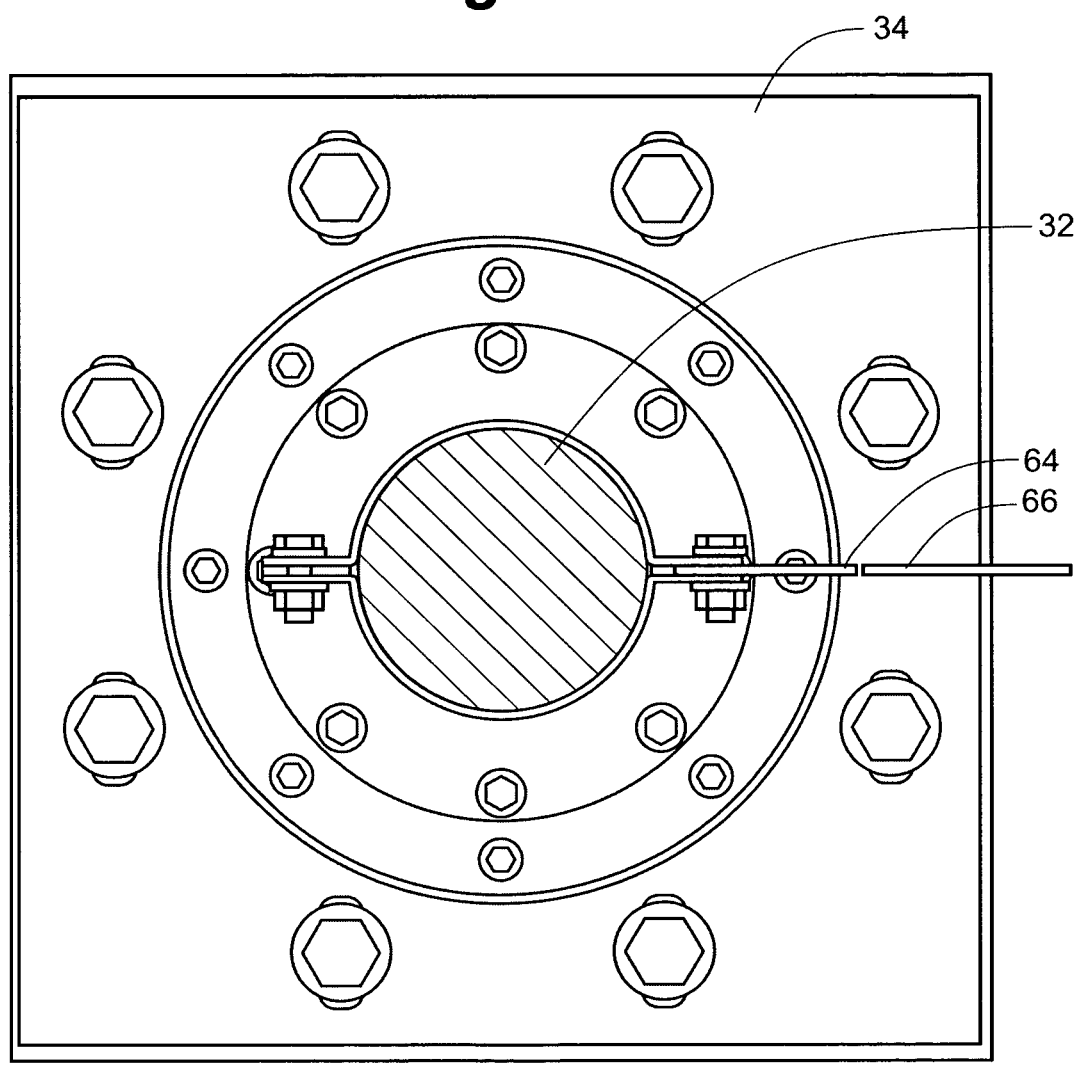
FIG. 8 is a cross-section of the extension shaft taken along line C-C in FIG. 2.

FIG. 8 is a cross-section of extension shaft 32 taken along line C-C in FIG. 2. Depicted in FIG. 8 are: extension shaft 32, stuffing box 34, wear indicator 64, and wear mark 66. Wear indicator 64 can be clamped to, otherwise attached to, or integral with extension shaft 32. Wear indicator 64 aligns with wear mark 66 to indicate erosion of wear bars 52.

As described above, extension shaft 32 is attached to sliding frame 24, which reciprocates across floor 18. Plate inserts 44 on bottom of sliding frame 24 contact wear bars 52 extending above floor 18. Over time, wear bars 52 in floor 18 erode from mechanical friction, positioning plate inserts 44 of sliding frame 24 ever closer to floor 18. In other words, wear distance 56 decreases as wear bars 52 erode. Eventually, wear distance 56 approaches zero because a top of wear bars 52 are essentially flush with a top of floor 18. When wear distance 56 is substantially zero, sliding frame 24 will be at its lowest point, closest to floor 18. This low position of sliding frame 24 is indicated external to walls 16 of bin 10 by wear indicator 64 on extension shaft 32. While wear bars 52 eroded and wear distance 56 decreased, extension shaft 32 having wear indicator 64 moved vertically downwards with respect to stationary wear mark 66. When wear indicator 64 is parallel with wear mark 66, wear distance 56 is essentially zero and thus, wear bars 52 should be replaced so that plate inserts 44 do not cause wear on floor 18. Wear indicator 64 allows for monitoring of wear distance 56 and erosion of wear bars 52 external to walls 16 of bin 10.

Described above is a system and method for reducing wear in bin 10 having sliding frame 24. Hard plate inserts 44 are attached to a bottom of sliding frame and soft wear bars 52 extend through floor 18. Over time, as sliding frame 24 is reciprocated across floor 18, plate inserts 44 mechanically erode wear bars 52. The erosion of wear bars 52 can be monitored by wear indicator 64, located external to bin 10 walls 16. When wear indicator 64 is aligned with wear mark 66, wear bars 52 are no longer extending above floor 18 and need replacement. If wear bars 52 are not replaced, continued reciprocation of sliding frame 24 will cause erosion of floor 18. Pockets 54 attaching wear bars 52 into floor 18, are easily removed from underneath bin 10 floor 18. Old wear bars 52 are discarded and replaced by new wear bars 52. Pockets 54 carrying new wear bars 52 are reattached to floor 18, once again protecting floor 18 from erosion. The ability to monitor component wear and replace sacrificial wear components without removing material from bin 10 is advantageous in the industry.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system comprising:
    a receptacle having at least one wall and a floor for holding material within the receptacle;
    an opening in the floor for accessing material held in the receptacle;
    a sliding frame located above and parallel to the floor for agitating material held in the receptacle, with a first outer rail and a second outer rail defining opposite sides of the sliding frame and cross rails running between the first outer rail and the second outer rail; and
    a plurality of wear bars extending above a top of the floor toward the sliding frame, the wear bars raising the sliding frame off the floor to prevent contact between the sliding frame and the floor, wherein the wear bars are positioned so that the sliding frame slides on the wear bars.

2. The system of claim 1, further comprising:
    a plurality of removable pockets attached to the floor, each pocket carrying one wear bar and allowing for replacement thereof.

3. The system of claim 2, further comprising:
    a plurality of plate inserts attached to a bottom of the sliding frame and extending toward the floor.

4. The system of claim 3, wherein the removable pockets are attached to a bottom of the floor and position the wear bars within the floor such that each wear bar extends above a top of the floor for sliding contact with the plate inserts.

5. The system of claim 4, wherein the plate inserts are attached to and extend below a bottom of the sliding frame for sliding contact with the wear bars.

6. The system of claim 1, further comprising:
    a hydraulic cylinder located outside of the wall;
    an extension shaft having a first end attached to the hydraulic cylinder, a center extending through the wall, and a second end attached to the sliding frame for actuating the frame across the floor.

7. The system of claim 6, further comprising:
    a wear indicator located on the first end of the extension shaft for indicating mechanical erosion of the wear bars.

8. The system of claim 7, further comprising:
    a stuffing box located between the hydraulic cylinder and the wall, wherein the extension shaft extends through the stuffing box.

9. The system of claim 1, wherein the receptacle is a rectangular holding bin having a push floor.

10. A system for reducing wear, the system comprising:
a holding receptacle with at least one wall and a floor;
a sliding frame positioned in the holding receptacle above and parallel to the floor;
a plurality of hard plate inserts attached to a bottom of the sliding frame and extending toward the floor; and
a plurality of soft wear bars attached to the floor and extending above a top of the floor toward the sliding frame, wherein the wear bars space the frame from the floor and prevent contact therebetween, and wherein the wear bars will erode from frictional contact with the hard plate inserts as the sliding frame is slid across the floor.

11. The system of claim 10, further comprising:
a plurality of pockets attached to a bottom of the floor, each pocket positioning a wear bar with respect to a plate insert, wherein the wear bars are sacrificial and replaced by removal of the pockets.

12. The system of claim 11, wherein the plurality of pockets are removable from outside of the receptacle.

13. The system of claim 10, further comprising:
a wear indicator connected to the sliding frame for indicating mechanical erosion of the wear bars.

14. The system of claim 13, wherein the wear indicator is readable from outside of the receptacle.

15. A system comprising:
a receptacle having at least one wall and a floor for holding material within the receptacle;
an opening in the floor for accessing material held in the receptacle;
a sliding frame located above and parallel to the floor for agitating material held in the receptacle;
a hydraulic cylinder located outside of the wall;
an extension shaft having a first end attached to the hydraulic cylinder, a center extending through the wall, and a second end attached to the sliding frame for actuating the frame across the floor; and
a wear indicator located on the first end of the extension shaft for indicating mechanical erosion of a component within the receptacle that moves vertically downwards with respect to a stationary wear mark as the component erodes, wherein vertical alignment of the wear indicator and the stationary wear mark indicates that the component should be replaced.

16. The system of claim 15, further comprising:
a stuffing box located between the hydraulic cylinder and the wall, wherein the extension shaft extends through the stuffing box.

17. The system of claim 15, further comprising:
at least one wear bar extending above a top of the floor toward the sliding frame, the wear bar raising the sliding frame off the floor to prevent contact between the sliding frame and the floor.

18. The system of claim 17, further comprising:
a removable pocket attached to the floor, the pocket carrying the wear bar and allowing for replacement thereof.

19. The system of claim 18, further comprising:
at least one plate insert attached to a bottom of the sliding frame and extending toward the floor.

20. The system of claim 19, wherein the removable pocket is attached to a bottom of the floor and positions the wear bar within the floor such that the wear bar extends above a top of the floor for sliding contact with the plate insert.

* * * * *